United States Patent
Galbas

(10) Patent No.: US 9,616,805 B2
(45) Date of Patent: Apr. 11, 2017

(54) METHOD AND DEVICE FOR CONTROLLING A HEADLAMP OF A VEHICLE

(75) Inventor: Roland Galbas, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/240,019

(22) PCT Filed: Jul. 3, 2012

(86) PCT No.: PCT/EP2012/062915
§ 371 (c)(1),
(2), (4) Date: May 16, 2014

(87) PCT Pub. No.: WO2013/026608
PCT Pub. Date: Feb. 28, 2013

(65) Prior Publication Data
US 2014/0257644 A1     Sep. 11, 2014

(30) Foreign Application Priority Data

Aug. 23, 2011   (DE) .................. 10 2011 081 357

(51) Int. Cl.
*G06F 7/00*   (2006.01)
*B60Q 1/08*   (2006.01)

(52) U.S. Cl.
CPC .............. *B60Q 1/08* (2013.01); *B60Q 1/085* (2013.01); *B60Q 2300/312* (2013.01); *B60Q 2300/45* (2013.01)

(58) Field of Classification Search
CPC ........... G06K 9/00818; G06K 9/00825; G06K 9/2027; G06K 9/3233; B60Q 1/06; B60Q 1/064; B60Q 1/068; B60Q 1/0683; B60Q 1/0686; B60Q 1/072; B60Q 1/076; B60Q 1/08; B60Q 1/085; B60Q 1/10; B60Q 1/105; B60Q 1/11; B60Q 1/115; B60Q 1/12;
(Continued)

(56) References Cited

U.S. PATENT DOCUMENTS

2009/0045323 A1*   2/2009   Lu ................... B60Q 1/1423
                                                          250/208.1
2011/0176003 A1    7/2011   Higgins-Luthman et al.
(Continued)

FOREIGN PATENT DOCUMENTS

CN     2080917 U       7/1991
CN     101190664 A     6/2008
(Continued)

OTHER PUBLICATIONS

International Search Report corresponding to PCT Application No. PCT/EP2012/062915, mailed Oct. 15, 2012 (German and English language document) (5 pages).

*Primary Examiner* — Muhammad Shafi
(74) *Attorney, Agent, or Firm* — Maginot, Moore & Beck LLP

(57) ABSTRACT

A method for controlling a headlamp of a vehicle includes performing an image evaluation to detect a reflection zone of an object located in the surroundings of the vehicle in at least one image of the surroundings of the vehicle. The method further includes providing a control signal for controlling the headlamp. The control signal is configured to intensify a light emission of the headlamp in the direction of the reflection zone.

8 Claims, 1 Drawing Sheet

(58) Field of Classification Search
CPC ........ B60Q 1/121; B60Q 1/122; B60Q 1/124; B60Q 1/14; B60Q 1/1407; B60Q 1/1415; B60Q 1/1423; B60Q 1/143; B60Q 2300/41; B60Q 2300/45
USPC .......................................................... 701/49
See application file for complete search history.

(56) References Cited

U.S. PATENT DOCUMENTS

2012/0182425 A1* 7/2012 Higgins-Luthman .. B60Q 1/085
348/148
2012/0229028 A1* 9/2012 Ackermann ........... B60Q 1/085
315/82

FOREIGN PATENT DOCUMENTS

| CN | 101423040 A | 5/2009 |
|---|---|---|
| DE | 100 60 734 A1 | 6/2002 |
| DE | 102 27 170 A1 | 1/2004 |
| DE | 102 54 806 B4 | 7/2008 |
| DE | 10 2007 048 717 A1 | 4/2009 |
| DE | 10 2008 025 947 A1 | 12/2009 |
| EP | 1 914 115 A2 | 4/2008 |
| EP | 2 127 944 A1 | 12/2009 |
| JP | 2011-79349 A | 4/2011 |

* cited by examiner

METHOD AND DEVICE FOR CONTROLLING A HEADLAMP OF A VEHICLE

This application is a 35 U.S.C. §371 National Stage Application of PCT/EP2012/062915, filed on Jul. 3, 2012, which claims the benefit of priority to Serial No. DE 10 2011 081 357.8, filed on Aug. 23, 2011 in Germany, the disclosures of which are incorporated herein by reference in their entirety.

BACKGROUND

The present disclosure relates to a method for controlling a headlamp of a vehicle, to a corresponding device, and to a corresponding computer program product.

Headlamps illuminate the area in front of a vehicle. If visibility is poor, this illumination may be perceived as insufficient from the point of view of a driver of the vehicle.

DE 102 54 806 B4 discloses a method for processing information from at least two information sources in a motor vehicle.

SUMMARY

Against this background, the present disclosure presents a method for controlling a headlamp of a vehicle, furthermore a device which uses this method, and finally a corresponding computer program product. Advantageous embodiments are evident from the respective dependent claims and the following description.

The disclosure is based on the insight that reflective elements in the surroundings of a vehicle can be illuminated in a targeted manner in order to make them clearly visible to the driver of the vehicle. In this case, reflective elements, in particular, can be highlighted. The reflective elements can be illuminated by means of one or more headlamps of the vehicle.

If there is very poor visibility, such as may prevail on account a high level of rain, fog or snowfall, vehicles rushing ahead, hazardous objects or important objects can only be weakly illuminated despite powerful headlamps. This can be improved by using light reflection zones on vehicles traveling ahead or important objects in the case of very poor visibility or targeted highlighting of a lead vehicle. A corresponding use of reflection enables targeted highlighting of important objects in particular in the direction of travel in front of the vehicle, precisely also if visibility is poor.

The approach can be used in association with vehicle road lighting systems having the capability of variable light positioning and variable intensity setting, that is to say for example a variable light beam direction.

The approach can also be used in association with sensor systems relating to the surroundings such as a video sensor system, a radar sensor system or further systems such as TOF (time of flight—such as PMD systems). Such systems are increasingly being used in vehicles. In addition, it is possible to have recourse to vehicle-to-vehicle communication or vehicle-to-infrastructure communication.

The present disclosure provides a method for controlling a headlamp of a vehicle, comprising the following steps: carrying out an image evaluation in order to recognize, in at least one image of the surroundings of the vehicle, a reflection zone of an object situated in the surroundings of the vehicle; and providing a control signal for controlling the headlamp, wherein the control signal is designed to intensify a light emission of the headlamp in the direction of the reflection zone.

The vehicle can be, for example, a passenger vehicle or a truck. The headlamp can be part of a vehicle road lighting system, for example a front headlamp designed to illuminate a region of the surroundings of the vehicle, in particular the area in front of the vehicle. The image can be an image which is received directly from an image capture unit via an interface. Alternatively, the image can be an image which is based on an image recorded by an image capture unit and which has been conditioned by means of image conditioning. Moreover, the expression image can be understood to be representative of an image excerpt from a larger original image. The image capture unit can be a camera of the vehicle, said camera being designed to capture at least one region of the surroundings of the vehicle and to image it in the form of the image. In particular, the image capture unit can be designed to capture a region of the surroundings that is illuminated by the headlamp, and thus to capture light emitted by the headlamp and reflected at the reflection zone. The image can be a digital image composed of a multiplicity of pixels. Each pixel can comprise information about a light intensity. For the purpose of image evaluation, it is possible to have recourse to known methods. By means of the image evaluation, light regions of the surroundings imaged by the image can be distinguished from dark regions of the imaged surroundings. The reflection zone can be imaged in the image as a region to which a high brightness is allocated. Moreover, the image evaluation can comprise object recognition that can be used to recognize typical shapes and sizes of relevant reflection zones. The reflection zone can be a reflective element of a vehicle (e.g. reflectors, rear lights or license plates) or of an object, for example of a roadway marking or of a road sign. The reflective element can have, for example, a reflective color or a reflective surface shape in order to be able to reflect incident light. The control signal for controlling the headlamp can be designed to control or set the light emission of the headlamp. The control signal can be provided directly to the headlamp or to a controller of the headlamp via an interface. If the image evaluation recognized a reflection zone and classified it as relevant, for example on the basis of criteria for safely driving the vehicle on a roadway, then the light emission of the headlamp can be set for highlighting the reflection zone. By way of example, the reflection zone can be illuminated to a greater extent than the direct or further surroundings of the reflection zone. The headlamp can be part of a vehicle road lighting system of the vehicle. The headlamp can be a front headlamp or a system comprising both front headlamps of the vehicle. Moreover, it can be a headlamp in addition to the conventional front headlamps, or an additional light source that is used specifically for highlighting one or more recognized reflection zones. The headlamps can involve an adjustable luminous characteristic. A brightness or intensity and a distribution of the light emitted by the headlamp can be defined by the luminous characteristic. By means of suitable control of the headlamp, the light emitted by the headlamp can correspond to the luminous characteristic. The luminous characteristic can define the fact that different segments or regions of a light beam emitted by the headlamp have different light intensities. In this way, regions of the surroundings that are illuminated by the headlamp can be allocated to different light intensities. By setting the luminous characteristic, it is thus possible to set a light distribution in that region of the surroundings of the vehicle which is illuminated by the headlamp. The luminous characteristic can be set for example by targeted control of individual light sources of the headlamp, by dimming of individual regions of the headlamp or setting of focusing elements of the headlamp.

The method can comprise a step of assessing a visibility prevailing in the surroundings of the vehicle. In this case, the step of providing the control signal can be carried out if the visibility is assessed as poor, and at least the step of providing the control signal cannot be carried out if the visibility is assessed as good. The visibility can be assessed on the basis of predefinable criteria which can relate, for example, to a maximum current visibility range arising for the driver of the vehicle. If the visibility is classified as good, then it is not necessary to highlight the reflection zone. By contrast, if the visibility is classified as poor, then the reflection zone can be highlighted in order to facilitate orientation, for example, for the driver or a driving assistance system. Accordingly, individual or all further steps of the method can be performed or not performed, depending on the assessment of visibility.

In accordance with one embodiment, the method can comprise a step of determining the object as a vehicle traveling ahead of the vehicle. The object can be determined on the basis of the image, temporally preceding or subsequently captured images or other information captured or received by a system of the vehicle. In response to the object being determined, an already recognized reflection zone can be assigned to the object or it is possible to search for a reflection zone that is typical of the object. The vehicle traveling ahead can be a vehicle traveling directly in front of the vehicle performing the method. By highlighting a reflection zone of the vehicle traveling ahead, it is possible to make it easier for the driver of the following vehicle to maintain a correct distance from the vehicle. It is also possible to make it easier to stay in lane, since bends in the course of the lane can be recognized at an early stage on account of the movement of the vehicle traveling ahead.

Additionally or alternatively, the method can comprise a step of carrying out an image evaluation in order to recognize, in at least one image of the surroundings of the vehicle, a reflection zone of an object situated in the surroundings of the vehicle. The object can be an object that is important for achieving a driving task, for example safely driving the vehicle on a roadway or finding a journey destination. Information about corresponding objects can be stored and used by the image evaluation in order to recognize a corresponding object. The object can be, for example, a road sign, a roadway marking or a danger spot, equipped in each case with a reflection zone for better visibility.

Generally, the method can therefore comprise a step of determining the object as an object which is relevant with regard to a driving task to be carried out by a driver of the vehicle. In this case the object can be a moving object, such as a vehicle rushing ahead, or a stationary object, such as a roadway marking.

In accordance with one embodiment, the control signal can be designed to orient at least one light beam of the headlamp toward the reflection zone in order to intensify the light emission of the headlamp in the direction of the reflection zone. This is appropriate in the case of a headlamp comprising one or a plurality of light sources having an adjustable emission direction. In order to highlight the reflection zone, therefore, a radiation direction of the at least one light beam can be varied such that the at least one light beam is oriented toward the reflection zone.

Moreover, the control signal can be designed to vary a light distribution of the headlamp in order to intensify the light emission of the headlamp in the direction of the reflection zone. This is appropriate in the case of a headlamp in which the light distribution is adjustable.

Moreover, the control signal can be designed to concentrate a light emission of the headlamp on the reflection zone in order to intensify the light emission of the headlamp in the direction of the reflection zone. This is appropriate in the case of a headlamp having a focusing unit for focusing at least part of the emitted light.

The method can comprise a step of recognizing a movement of the reflection zone relative to the vehicle, and a step of providing a further control signal for controlling the headlamp. In this case, the further control signal can be designed to track a further light emission of the headlamp to the movement of the reflection zone. The further control signal can be provided temporally after the original control signal for intensifying the light emission of the headlamp in the direction of the reflection zone. In this way, renewed recognition of the reflection zone is not necessary. Instead, a reflection zone, once it has been recognized, can be continuously highlighted by the light emission of the headlamp.

The present disclosure furthermore provides a device which is designed to carry out or implement the steps of the method according to the disclosure in corresponding units. By means also of this embodiment variant of the disclosure in the form of a device, the object on which the disclosure is based can be achieved rapidly and efficiently.

A device can be understood to mean in the present case an electrical apparatus which processes sensor signals and outputs control signals in a manner dependent thereon. The device can comprise an interface that can be designed in terms of hardware and/or software. In the case of a hardware design, the interfaces can be, for example, part of a so-called system ASIC that comprises a wide variety of functions of the device. However, it is also possible for the interfaces to be dedicated integrated circuits or to consist at least partly of discrete components. In the case of a software design, the interfaces can be software modules that are present alongside other software modules for example on a microcontroller.

Also advantageous is a computer program product comprising program code which can be stored on a machine-readable carrier such as a semiconductor memory, a hard disk storage unit or an optical storage unit and is used for carrying out the method according to any of the embodiments described above, if the program is executed on a computer or a device.

BRIEF DESCRIPTION OF THE DRAWINGS

The disclosure is explained in greater detail below by way of example with reference to the accompanying drawings, in which.

DETAILED DESCRIPTION

In the following description of preferred exemplary embodiments of the present disclosure, identical or similar reference signs are used for the elements that act similarly and are illustrated in the different figures, a repeated description of said elements being dispensed with.

Figure 1:
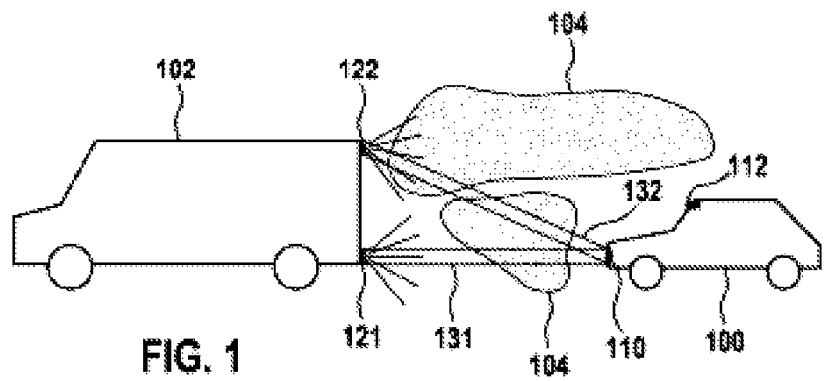
FIG. 1 shows a situation with two vehicles in accordance with one exemplary embodiment of the present disclosure.

FIG. 1 shows a situation with a vehicle 100 and a vehicle 102 traveling ahead, in accordance with one exemplary embodiment of the present disclosure. The vehicles 100, 102 are moving in the same direction of travel, the vehicle 102 traveling directly ahead of the vehicle 100. The visibility in the area in front of the vehicle 100 is poor, i.e. greatly restricted, on account of weather influences, here fog 104. For a driver of the vehicle 100, the vehicle 102 traveling ahead can be discerned only with difficulty on account of the poor visibility.

The vehicle 100 has a headlamp 110. The headlamp 110 can be designed to illuminate the area in front of the vehicle 100 and in addition to illuminate specific regions of the area in front in a targeted manner with an increased light intensity. Alternatively, the headlamp 110 can be designed as an additional headlamp designed, in addition to a main headlamp used for illuminating the area in front, to illuminate specific regions of the area in front in a targeted manner with an increased light intensity. In order to recognize one or a plurality of specific regions of the area in front which can subsequently be illuminated in a targeted manner by the headlamp 110, the vehicle 100 comprises a camera 112 designed to capture the area in front of the vehicle 100.

In accordance with this exemplary embodiment, the vehicle 102 traveling ahead has a first reflection zone 121 and a second reflection zone 122. The first reflection zone 121 is arranged in a lower portion of a rear side of the vehicle 102 and the second reflection zone 122 is arranged in an upper portion of the rear side of the vehicle 102. The reflection zones 121, 122 can be, for example, reflection elements or reflection surfaces arranged on the outer skin of the vehicle 102. If the reflection zones 121, 122 are illuminated, in particular by a light source of the following vehicle 100, then they appear as bright areas which, in particular in darkness and if visibility is poor, make it easier to recognize the vehicle 102 from behind or even make it possible in the first place.

The headlamp 110 is designed to illuminate the reflection zones 121, 122 with an increased light intensity in comparison with the surroundings of the reflection zones 121, 122. Two light beams 131, 132 emitted by the headlamp 110 are shown by way of example. A first light beam 131 is directed towards the first reflector 121 proceeding from the headlamp 110. A second light beam 132 is directed toward the second reflection 122 proceeding from the headlamp 110. The headlamp 110 can be designed to emit exclusively light oriented toward the reflection zones 121, 122, such as the light beams 131, 132. Alternatively, the headlamp 110 can be designed to emit, in addition to the light beams 131, 132 having a high luminance, further light having lower luminance in order to illuminate the area in front of the vehicle 100. Depending on the exemplary embodiment, the reflection zones 121, 122 can be illuminated both by the light beams 131, 132 and by the light having lower luminance or exclusively by the light beams 131, 132. At least a portion of the light impinging on the reflection zones 121, 122 is reflected and can be captured as reflected light by the driver of the vehicle 100 or the camera 112. By virtue of the fact that the reflection zones 121, 122 are illuminated with a higher light intensity per area than a region surrounding the reflection zones 121, 122, for example the rest of the rear side of the vehicle 102, the reflection zones 121, 122 are readily visible to the driver of the vehicle 100 or readily detectable on an image of the camera 112.

The reflection zones 121, 122 shown in FIG. 1 have been chosen merely by way of example. For example, the reflection zones 121, 122 can be arranged at a different position on the vehicle 102, or they can be reflection zones 121, 122 which are not arranged on a vehicle traveling ahead, but rather on an object, for example a sign or the roadway surface. The headlamp 110 can be designed to highlight only a single reflection zone 121, 122 or a plurality of reflection zones 121, 122. For intensifying or orienting a light beam 131, 132, the headlamp 110 can have suitable technical means. If the vehicle 100 has a plurality of headlamps 110, for example two thereof, then they can be designed to highlight in each case the same reflection zone or the same reflection zones or different reflection zones 121, 122.

In accordance with the exemplary embodiment shown in FIG. 1, the reflection zones 121, 122 are especially illuminated in the case of poor visibility, for example in the case of fog 104. This leads to maximum light utilization.

In situations with poor visibility, special reflection zones 121, 122 of vehicles rushing ahead are highlighted, that is to say explicitly illuminated, by means of the headlamps 110. That is to say that the light intensity is concentrated on the reflection zones 121, 122 on account of the very poor visibility.

This highlighting is performed on a lead vehicle 102. The lead vehicle 102 is determined in a manner similar to that in the case of ACC (Adaptive Cruise Control) systems. The vehicle 100 maintains in the direction of travel a speed similar to that of the vehicle 102 traveling ahead. The driver of the vehicle 100 is thus offered a guide light in conditions of very poor visibility.

Moreover, dangerous objects can also be explicitly illuminated with special reflection zones.

In accordance with one exemplary embodiment, a plurality of sensings can take place in the vehicle 100. Firstly, the situation can be sensed. In other words, very poor visibility can be recognized, which is caused e.g. by a high degree of rain, fog 104 or snowfall. Furthermore, vehicles 102 rushing ahead, in part in the direction of travel as so-called lead vehicles, or dangerous or important objects can be sensed. Finally, special light reflection surfaces 121, 122 on vehicles 102 rushing ahead or on dangerous or important objects can be sensed. On the basis of the sensings carried out, illumination of lead vehicles 102 or dangerous objects with the use of special reflection zones 121, 122 is performed as the actual function. For this purpose, it is possible to use variable light positioning or variable light intensity setting, that is to say a variable light beam direction of the headlamp 110 for highlighting the special reflection zones 121, 122 of the vehicle 102 rushing ahead, in part in the direction of travel as lead vehicles, or dangerous or important objects.

In accordance with one exemplary embodiment, recognition of a situation with poor visibility is followed by recognition of reflection zones 121, 122. A variation of the light from the headlamp or headlamps 110 is subsequently carried out in order to carry out highlighting of the reflection zones 121, 122 under said situation and with the reflection zones 121, 122 having been recognized.

Figure 2:
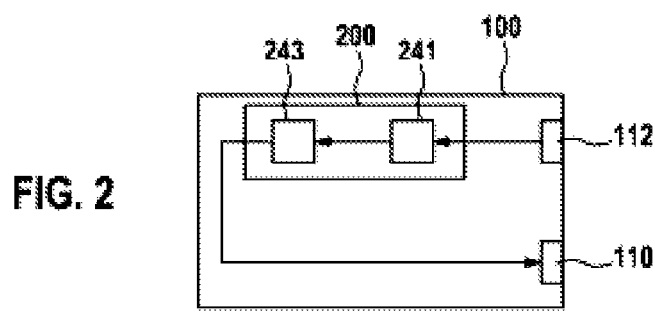
FIG. 2 shows a block diagram of a device for controlling a headlamp of a vehicle in accordance with one exemplary embodiment of the present disclosure.

FIG. 2 shows a block diagram of a device 200 for controlling a headlamp 110 of a vehicle 100 in accordance with one exemplary embodiment of the present disclosure. The device can be realized in the vehicle 100 shown in FIG. 1.

The device 200 has an interface to the headlamp 110 or to a controller for controlling the headlamp 110, and an interface to a camera 112 or a unit for providing an image or image information of an image of the camera 112. The headlamp 110 and the camera 112 can be the units described with reference to FIG. 1.

The device 200 is designed to receive and evaluate an image or image information of an image of the camera 112, to determine information for controlling the headlamp 110 and output it in the form of a control signal, for example. In relation to the exemplary embodiment shown in FIG. 1, the image can image at least the rear side of the vehicle traveling ahead with the reflection zones. The information for controlling the headlamp 110, said information being determined by the device 200, may be suitable or used for controlling the headlamp 110 such that the reflection zones are illuminated by the headlamp 110 particularly intensively in comparison with regions surrounding the reflection zones. Consequently, the control signal may be suitable for bringing about an emission and orientation of the light beams 131, 132 shown in FIG. 1.

The device 200 comprises a unit 241 for carrying out an image evaluation and a unit 243 for providing the control signal. By means of the image evaluation, the image of the camera 112 received via the interface of the device 200 or image information based thereon can be evaluated in order to recognize a reflection zone of a relevant object situated in the surroundings of the vehicle 100. Furthermore, the unit 241 can be designed to carry out an image evaluation or some other suitable unit can be designed to determine a position of the reflection zone relative to the vehicle 100 and in particular relative to the headlamp 110. Furthermore, a size or areal extent of the reflection zone can be determined. Information about the type and additionally the position of a reflection zone and of an object comprising the reflection zone can also be received via an interface to a further system of the vehicle 100, for example a distance measuring unit or a communication interface for receiving data transmitted by the object, for example. Information about the reflection zone that is relevant for controlling the headlamp 110 is output to the providing unit 243. The providing unit 243 is designed to determine the control signal for controlling the headlamp on the basis of the information about the reflection zone. The control signal can be output by the device 200 via the corresponding interface.

Figure 3:
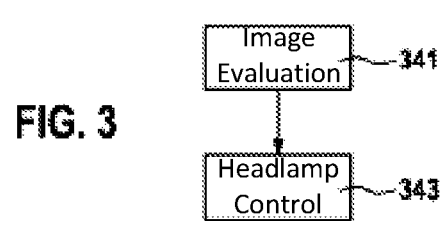
FIG. 3 shows a flow chart of a method for controlling a headlamp of a vehicle in accordance with one exemplary embodiment of the present disclosure.

FIG. 3 shows a flow chart of a method for controlling a headlamp of a vehicle in accordance with one exemplary embodiment of the present disclosure. The method can be performed by the device shown in FIG. 2. The surroundings can be illuminated by a headlamp of the vehicle in a conventional manner uniformly or according to a fixedly set or predefinable luminous characteristic. The luminous characteristic can contribute, for example, to the oncoming traffic not being dazzled or to a bend being better illuminated.

In a step 341 an image of the surroundings of the vehicle is evaluated. Depending on the situation, for example, a vehicle traveling ahead or an object relevant to the journey of the vehicle can be imaged in the image of the surroundings. The vehicle traveling ahead or the object can be identified by means of a reflection zone, the reflection of which is likewise imaged by the image. The image may have been captured in a preceding step. Moreover, a plurality of images captured successively or by different cameras can be evaluated in step 341.

A step 343 involves determining and providing a control signal for controlling the headlamp, said control signal being suitable for intensifying a light emission of the headlamp in the direction of the reflection zone. The previous illumination of the surroundings of the vehicle is changed on account of the intensification. In particular, the illumination of those regions of the surroundings which are assigned to the reflection zone is intensified. In this case, the illumination of the other regions of the surroundings can either remain the same or, if appropriate, be reduced in a region-dependent manner. In this way, the contrast between the reflection zone and the other regions or at least the regions adjoining the reflection zone and thus the visibility of the reflection zone can be increased.

Steps 341, 343 can be repeated continuously in order to highlight the reflection zone continuously and to search for further reflection zones continuously. Furthermore, the visibility range from the point of view of the driver of the vehicle 100 can be checked continuously. Steps 341, 343 can be performed in response thereto only if the visibility range proves to be poor, for example is below a predefinable threshold. If the visibility range proves to be good, intensification of the illumination of a reflection zone is not necessary.

If a previously recognized reflection zone leaves the region imaged by the image or if a reflection zone is classified as no longer relevant, then the surroundings of the vehicle can be illuminated in a conventional manner again. Accordingly, the surroundings can be illuminated in a conventional manner again if the visibility is no longer classified as poor, but rather as good. If a previous reflection zone is classified as no longer relevant, because it is replaced by a newly recognized reflection zone classified as relevant, then the newly recognized reflection zone can subsequently be highlighted instead of the previous reflection zone. Such a procedure can take place, for example, if an overtaking vehicle filters in between two vehicles. In this case, for the vehicle at the back, the reflection zone of the overtaking vehicle can be classified as relevant and correspondingly illuminated.

The exemplary embodiments described and shown in the figures have been chosen merely by way of example. Different exemplary embodiments can be combined with one another completely or with regard to individual features. Moreover, one exemplary embodiment can be supplemented by features of a further exemplary embodiment. Furthermore, method steps according to the disclosure can be performed repeatedly and in a different order from that described.

The invention claimed is:

1. A method for controlling a headlamp of a first vehicle in order to achieve safe driving of the first vehicle, comprising:
   receiving, via an interface of a control device in the first vehicle, at least one image of a surrounding area of the first vehicle from a camera of the first vehicle;
   determining, with the control device, that an object in the at least one image is a second vehicle traveling ahead of the first vehicle;
   performing, with the control device, an image evaluation in order to recognize, in the least one image, a reflection zone of the second vehicle, the reflection zone being a portion of the second vehicle that appears brighter in the at least one image than other portions of the second vehicle; and
   providing, with the control device, a control signal to control the headlamp, the control signal being configured to intensify a light emission of the headlamp in the direction of the reflection zone such that a contrast between the reflection zone and other regions is increased and a visibility of the reflection zone is increased.

2. The method as claimed in claim 1, further comprising assessing a visibility prevailing in the surroundings of the first vehicle,
   wherein the control signal is provided if the visibility is assessed as poor, and
   wherein the control signal is not provided if the visibility is assessed as good.

3. The method as claimed in claim 1, wherein the control signal is configured to orient at least one light beam of the headlamp toward the reflection zone in order to intensify the light emission of the headlamp in the direction of the reflection zone.

4. The method as claimed in claim 1, wherein the control signal is configured to vary a light distribution of the headlamp in order to intensify the light emission of the headlamp in the direction of the reflection zone.

5. The method as claimed in claim 1, wherein the control signal is configured to concentrate a light emission of the headlamp on the reflection zone in order to intensify the light emission of the headlamp in the direction of the reflection zone.

6. The method as claimed in claim 1, further comprising:
   recognizing a movement of the reflection zone relative to the first vehicle; and
   providing a further control signal to control the headlamp, wherein the further control signal is configured to track a further light emission of the headlamp to the movement of the reflection zone.

7. A device in a first vehicle for controlling a headlamp of the first vehicle in order to achieve safe driving of the first vehicle, the device being configured to:
   receive, via a first interface of the device, at least one image of a surrounding area of the first vehicle from a camera of the first vehicle;
   determine that an object in the at least one image is a second vehicle traveling ahead of the first vehicle;
   perform an image evaluation in order to recognize, in the least one image, a reflection zone of the second vehicle, the reflection zone being a portion of the second vehicle that appears brighter in the at least one image than other portions of the second vehicle; and
   provide a control signal to control the headlamp, the control signal being configured to intensify a light emission of the headlamp in the direction of the reflection zone such that a contrast between the reflection zone and other regions is increased and a visibility of the reflection zone is increased.

8. A computer program product comprising program code stored on a non-transitory computer-readable medium for carrying out a method for controlling a headlamp of a first vehicle in order to achieve safe driving of the first vehicle when the program is executed on a device in the first vehicle, the method including:
   receiving, via an interface of the device, at least one image of a surrounding area of the first vehicle from a camera of the first vehicle;
   determining, with the device, that an object in the at least one image is a second vehicle traveling ahead of the first vehicle;
   performing, with the device, an image evaluation in order to recognize, in the least one image, a reflection zone of the second vehicle, the reflection zone being a portion of the second vehicle that appears brighter in the at least one image than other portions of the second vehicle; and
   providing, with the device, a control signal to control the headlamp, the control signal being configured to intensify a light emission of the headlamp in the direction of the reflection zone such that a contrast between the reflection zone and other regions is increased and a visibility of the reflection zone is increased.

* * * * *

UNITED STATES PATENT AND TRADEMARK OFFICE
CERTIFICATE OF CORRECTION

| | |
|---|---|
| PATENT NO. | : 9,616,805 B2 |
| APPLICATION NO. | : 14/240019 |
| DATED | : April 11, 2017 |
| INVENTOR(S) | : Roland Galbas |

It is certified that error appears in the above-identified patent and that said Letters Patent is hereby corrected as shown below:

In the Claims

In Column 8, Lines 55-56, Lines 10-11 of Claim 1 should read:
performing, with the control device, an image evaluation
    in order to recognize, in the at least one image, a reflection In Column 10, Lines 24-25, Lines 13-14 of Claim 8 should read:
performing, with the device, an image evaluation in order
    to recognize, in the at least one image, a reflection zone of Signed and Sealed this
Eleventh Day of July, 2017

Joseph Matal
*Performing the Functions and Duties of the
Under Secretary of Commerce for Intellectual Property and
Director of the United States Patent and Trademark Office*